US009521439B1

(12) United States Patent
Hsu et al.

(10) Patent No.: US 9,521,439 B1
(45) Date of Patent: Dec. 13, 2016

(54) SYSTEMS AND METHODS FOR CORRELATING MULTIPLE TCP SESSIONS FOR A VIDEO TRANSFER

(75) Inventors: Wei-Jen Hsu, Cupertino, CA (US); Biswaranjan Panda, Santa Clara, CA (US); Jayaraman Iyer, San Jose, CA (US); Bhaskar Bhupalam, Santa Clara, CA (US); Pranav Bhargava, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 348 days.

(21) Appl. No.: 13/252,574

(22) Filed: Oct. 4, 2011

(51) Int. Cl.
| | |
|---|---|
| *G06F 15/16* | (2006.01) |
| *H04J 3/06* | (2006.01) |
| *H04N 5/93* | (2006.01) |
| *H04N 21/2343* | (2011.01) |
| *H04L 12/801* | (2013.01) |
| *H04N 5/76* | (2006.01) |

(52) U.S. Cl.
CPC ...... *H04N 21/234345* (2013.01); *H04L 47/10* (2013.01); *H04N 5/76* (2013.01)

(58) Field of Classification Search
CPC ..... H04L 47/10; H04N 21/23434; H04N 5/76; H04N 21/234345
USPC ........................... 709/227; 370/350; 386/282
See application file for complete search history.

(56) References Cited

U.S. PATENT DOCUMENTS

| | | | |
|---|---|---|---|
| 6,138,156 A | 10/2000 | Fletcher et al. | |
| 6,345,294 B1 | 2/2002 | O'Toole et al. | |
| 6,431,875 B1 | 8/2002 | Elliott et al. | |
| 6,449,647 B1 | 9/2002 | Colby et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,847,991 B1 | 1/2005 | Kurapati | |
| 6,850,982 B1 | 2/2005 | Siegel | |
| 6,853,630 B1 | 2/2005 | Manning | |
| 6,854,014 B1 | 2/2005 | Amin et al. | |

(Continued)

FOREIGN PATENT DOCUMENTS

WO    WO-0122642 A2    3/2001

OTHER PUBLICATIONS

Berners-Lee T. et al. "Hypertext Transfer Protocol—HTTP/1.0" Network Working Group. May 1996. 61 pages.

(Continued)

*Primary Examiner* — Viet Vu
*Assistant Examiner* — Michael A Chambers
(74) *Attorney, Agent, or Firm* — Patent Capital Group

(57) ABSTRACT

User equipments can download a video file by instantiating multiple video requests, each request specifying different parts of the video file. If each video request initiates a separate transmission control protocol (TCP) session, which is the case with an hypertext transfer protocol (HTTP) partial get request, then a network device in a communications network would be oblivious of contextual information, which indicates that the TCP sessions download different portions of the same video file. This disclosure provides systems and methods for correlating multiple TCP sessions so that a network device in a communications network can be aware of the contextual information.

24 Claims, 8 Drawing Sheets

(56) References Cited

U.S. PATENT DOCUMENTS

| | | | |
|---|---|---|---|
| 6,888,821 B2 | 5/2005 | Rasanen et al. | |
| 6,973,309 B1 | 12/2005 | Rygula et al. | |
| 7,100,192 B1* | 8/2006 | Igawa | H04L 29/06027 709/217 |
| 7,328,294 B2* | 2/2008 | Kim | G06F 9/5011 710/260 |
| 7,450,531 B2* | 11/2008 | Iyer | H04L 12/14 370/310 |
| 7,454,206 B1 | 11/2008 | Phillips et al. | |
| 7,486,658 B2* | 2/2009 | Kumar | H04L 47/10 370/252 |
| 7,680,755 B2 | 3/2010 | Machani | |
| 7,689,688 B2* | 3/2010 | Iwamoto | H04L 41/5009 709/201 |
| 7,707,300 B1 | 4/2010 | Champagne | |
| 7,724,753 B2 | 5/2010 | Naqvi et al. | |
| 7,782,851 B2* | 8/2010 | Zhao | H04L 1/188 370/390 |
| 7,813,759 B2 | 10/2010 | Virgile | |
| 7,855,982 B2 | 12/2010 | Ramankutty et al. | |
| 7,890,586 B1 | 2/2011 | McNamara et al. | |
| 7,945,648 B2 | 5/2011 | Tan | |
| 7,966,645 B2* | 6/2011 | Panda | G06Q 20/102 726/1 |
| 8,010,984 B2 | 8/2011 | Thukral | |
| 8,094,575 B1* | 1/2012 | Vadlakonda | H04L 45/123 370/252 |
| 8,099,508 B2* | 1/2012 | Mao | H04L 63/102 709/227 |
| 8,289,983 B2* | 10/2012 | Wang | H04L 1/1607 370/282 |
| 8,307,390 B2* | 11/2012 | Holden | G11B 27/005 725/34 |
| 8,321,905 B1* | 11/2012 | Streeter | H04N 21/4384 709/231 |
| 8,387,089 B1* | 2/2013 | Kunkel | H04N 5/76 725/37 |
| 8,392,530 B1* | 3/2013 | Manapragada | H04L 65/4076 348/211.3 |
| 8,510,375 B2* | 8/2013 | Bouazizi | H04N 21/23434 709/203 |
| 2002/0029260 A1 | 3/2002 | Dobbins et al. | |
| 2002/0131404 A1 | 9/2002 | Mehta et al. | |
| 2003/0016630 A1 | 1/2003 | Vega-Garcia et al. | |
| 2003/0105798 A1* | 6/2003 | Kim | G06F 9/4812 718/105 |
| 2003/0110234 A1 | 6/2003 | Egli et al. | |
| 2003/0133448 A1* | 7/2003 | Frink | H04N 21/43615 370/389 |
| 2004/0039820 A1 | 2/2004 | Colby et al. | |
| 2004/0047290 A1 | 3/2004 | Komandur et al. | |
| 2004/0111476 A1 | 6/2004 | Trossen et al. | |
| 2005/0005025 A1 | 1/2005 | Harville et al. | |
| 2005/0025156 A1* | 2/2005 | Smathers | H04L 69/16 370/395.5 |
| 2005/0132214 A1* | 6/2005 | Naftali | H04L 63/08 726/26 |
| 2005/0136942 A1 | 6/2005 | Timiri et al. | |
| 2005/0223248 A1 | 10/2005 | Lim et al. | |
| 2005/0246278 A1 | 11/2005 | Gerber et al. | |
| 2005/0251848 A1 | 11/2005 | Al-Janabi | |
| 2006/0010226 A1 | 1/2006 | Hurtta et al. | |
| 2006/0031559 A1 | 2/2006 | Sorokopud et al. | |
| 2006/0088011 A1* | 4/2006 | Iyer | H04L 12/14 370/338 |
| 2006/0218301 A1 | 9/2006 | O'Toole et al. | |
| 2007/0022199 A1 | 1/2007 | Tatsubori | |
| 2007/0025325 A1* | 2/2007 | Kumar | H04L 47/10 370/350 |
| 2007/0061469 A1* | 3/2007 | Rhim | H04L 65/4069 709/227 |
| 2008/0137541 A1 | 6/2008 | Agarwal et al. | |
| 2008/0155560 A1* | 6/2008 | Iwamoto | H04L 41/5009 719/318 |
| 2009/0268655 A1* | 10/2009 | Bertz | H04W 36/0055 370/312 |
| 2009/0300685 A1* | 12/2009 | Easter | H04N 7/147 725/62 |
| 2009/0320077 A1 | 12/2009 | Gazdzinski | |
| 2010/0211983 A1* | 8/2010 | Chou | H04L 47/10 725/93 |
| 2010/0211987 A1* | 8/2010 | Chou | H04N 21/2225 725/119 |
| 2010/0226428 A1 | 9/2010 | Thevathasan et al. | |
| 2010/0281042 A1 | 11/2010 | Windes et al. | |
| 2010/0325674 A1 | 12/2010 | Liu | |
| 2011/0072466 A1* | 3/2011 | Basso | G06F 17/30796 725/47 |
| 2011/0141950 A1* | 6/2011 | Patil | H04L 12/1818 370/261 |
| 2011/0154477 A1 | 6/2011 | Parla et al. | |
| 2011/0203006 A1 | 8/2011 | Gopalakrishnan | |
| 2011/0289108 A1 | 11/2011 | Bhandari et al. | |
| 2011/0299606 A1 | 12/2011 | Chen et al. | |
| 2011/0307545 A1* | 12/2011 | Bouazizi | H04N 21/23434 709/203 |
| 2012/0054664 A1 | 3/2012 | Dougall et al. | |
| 2012/0054809 A1 | 3/2012 | Chowdhury et al. | |
| 2012/0203861 A1 | 8/2012 | Flack et al. | |
| 2012/0265901 A1 | 10/2012 | Swenson et al. | |
| 2013/0144906 A1 | 6/2013 | Bhupalam et al. | |
| 2013/0144979 A1 | 6/2013 | Kansal et al. | |
| 2013/0216207 A1* | 8/2013 | Berry | H04N 5/76 386/282 |

OTHER PUBLICATIONS

Fielding R. et al. "Hypertext Transfer Protocol—HTTP/1.1" Network Working Group. Jun. 1999. 114 pages.

CTLabs Report, "SIP and RTP Denial of Service Attack Tests Summary Report." pp. 1-4. 2005. 4 pages.

http://www.3gpp.org, 3GPP TS 24.229 V6. 12.0 (Sep. 2006), pp. 1-304. Oct. 3, 2006, 304 pages.

http://www.3gpp.org/ftp/Specs/html-info/24229.htm printed Jan. 13, 2011. 4 pages.

No. Author Listed, "Net-SAFE—the security requirements framework for SBCs." NET-SAFE. Dec. 5, 2009, 4 pages.

\* cited by examiner

US 9,521,439 B1

SYSTEMS AND METHODS FOR CORRELATING MULTIPLE TCP SESSIONS FOR A VIDEO TRANSFER

FIELD OF THE DISCLOSURE

This disclosure relates generally to a system and method for correlating multiple TCP sessions of a video transfer in a communications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and user equipment (e.g., cellular telephones, user equipment). Such devices can connect to a network (e.g., the Internet) as long as the user is within range of such a wireless communication technology. Such devices can use connections to a network to download video files.

User equipment can download videos over communication networks by establishing communication channels with video servers. Oftentimes, these communication channels are established using an application layer protocol, which includes the hypertext transfer protocol (HTTP), the file transfer protocol (FTP), telnet, secure shell (SSH), the transport layer security (TLS), and the secure sockets layer (SSL). Most of these application layer protocols use a transport layer delivery mechanism called a transmission control protocol (TCP). Each TCP flow is treated independent of other TCP flows, with no intention to relate TCP flows in the networks. Certain application layer protocols, such as HTTP, allow user equipment to start viewing a video even before downloading the entire video. This technique is called a progressive download.

DESCRIPTION OF EXAMPLE EMBODIMENTS

Overview

Figure 1:
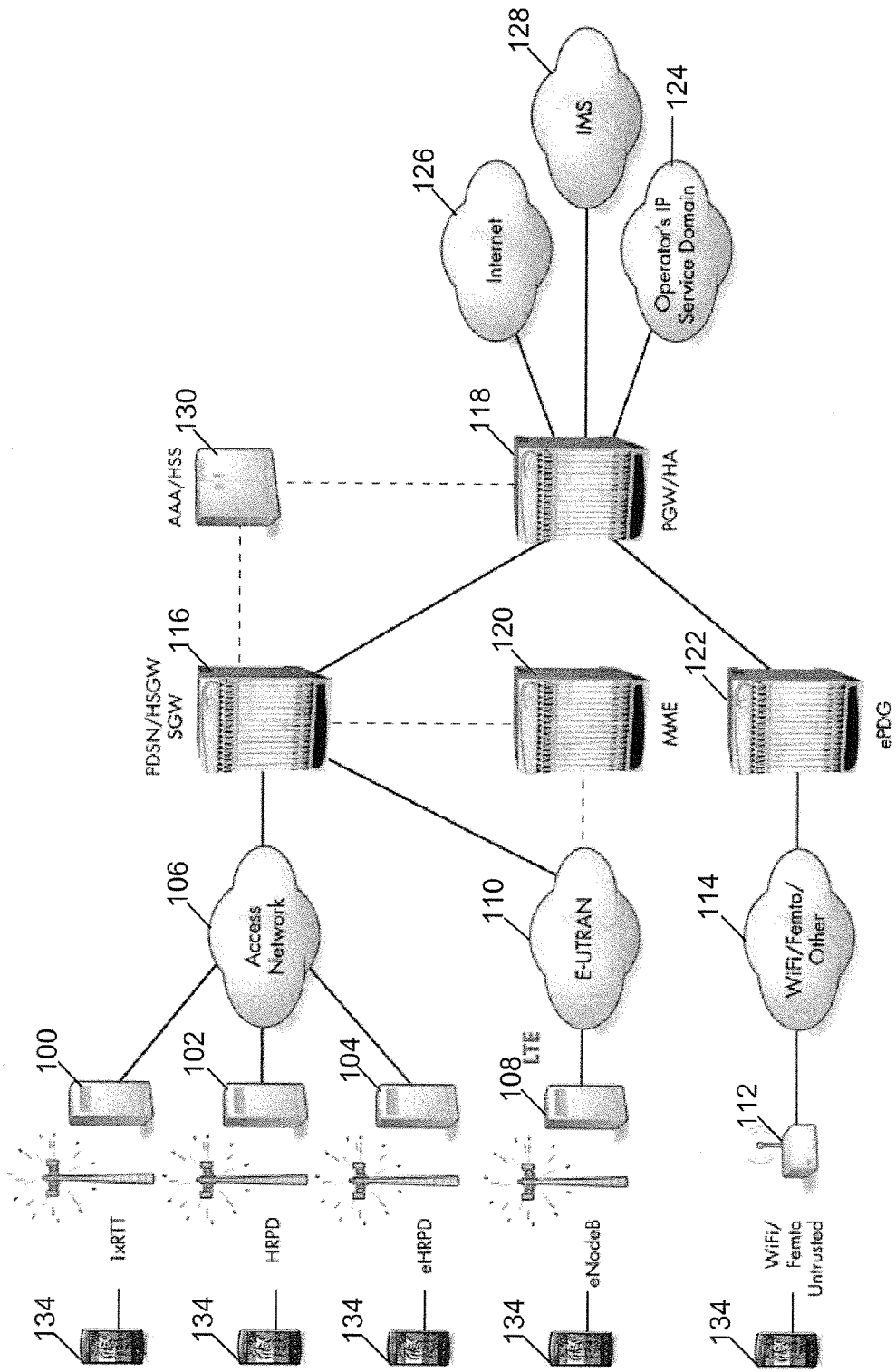
FIGS. 1-2 illustrate communication networks including a long term evolution (LTE) topology in accordance with some embodiments.

Certain embodiments disclose a method comprising receiving, at a gateway, a first video request over a first transmission control protocol (TCP) session and a second video request over a second TCP session, deriving a first identification of a first video file requested by the first video request, deriving a second identification of a second video file requested by the second video request, and comparing the first identification and the second identification to determine whether the first TCP session and the second TCP session are correlated.

Example Embodiments

In some implementations of a progressive download, a user equipment can be configured to send multiple video requests to download a single video file. In this case, each video request would request different parts of same video. For example, a user equipment can send a first HTTP request to download the first 5 seconds of a video; the user equipment can subsequently send a second HTTP request to download the subsequent 5 seconds of the same video. The HTTP request that enables a partial download of a video file is "HTTP partial get". The HTTP partial get request is specified in "Hypertext Transfer Protocol—HTTP/1.1," Internet Engineering Task Force, Request for Comments 2616, which is herein incorporated by reference in its entirety.

Each partial video request can be configured to initiate a unique transport layer session, such as a transmission control protocol (TCP) session, with a video server. Therefore, when a user equipment downloads a video file from a video server, the user equipment can initiate multiple transport layer sessions.

From the communication networks' point of view, these transport layer sessions are independent. A network device in the communication networks can figure out that TCP sessions are associated with a single UE. However, the network device cannot figure out which TCP sessions are collectively downloading a single video file.

Such contextual information—information indicating which transport layer sessions collectively download a single video file—can be important for certain video services. For example, consider video pacing. In a regular progressive download, a user equipment is configured to download video contents as rapidly as possible, regardless of the network conditions. While this strategy is useful when the network connection is slow, this strategy is inefficient when the network connection is fast because the user may not view all of the downloaded video. For example, when a user selects a video from YouTube, the user equipment can download full 30 seconds of the video almost instantaneously. However, of the 30 seconds of the video, the user may only view the first 3 seconds of the video and decide to stop the video, in which case the remaining 27 seconds of the video are not viewed and thus wasted. The goal of video pacing is to limit the video download speed so that a user equipment downloads just enough content for in-time playback. While the video download speed can be adjusted at a video server, the video download speed can also be adjusted at a network device in the communication path between a user equipment and the video server. Such a network device includes, for example, a gateway, a switch, a server, a firewall with cache, a router, a network hub, a mobile device, a load balancer, a policy enforcement point, a policy charging rules function, or a base station.

Adjusting video download speed at a network device entails analyzing video's metadata. In some video formats, such as Moving Picture Experts Group (MPEG) 4, the metadata is present only at the beginning of the video file, such as in a video file header. Therefore, if a single video file is downloaded using multiple TCP sessions, only the first TCP session would carry the metadata. Unless the network device knows that the metadata in the first TCP session is also applicable to subsequent TCP sessions, the network device cannot properly provide the video pacing service.

The contextual information can also be useful in tracking a video's popularity. Tracking a video's popularity can be important for network operators because the network operators can use this information to determine if the network operator can cache the video at a gateway and improve the network efficiency. A network operator may track the popularity of a video by counting the number of times the video is viewed by network users. One way of tracking this number is by counting the number of TCP sessions that have been established to access the video. For example, a network device, such as a gateway, can maintain a counter that keeps the total number of TCP sessions associated with a video during a particular time period. However, if the network operator is unaware that two TCP sessions are associated with a single video selection (i.e., the two TCP sessions are established by a single user equipment to download different parts of the video), then the network operator will run afoul of double-counting what is essentially a single viewing of the video. Unless the network operator knows that the TCP sessions are associated with a single video selection, the network device cannot properly track the popularity of the video.

To derive contextual information associated with TCP sessions, a network device can correlate the TCP sessions. The disclosed systems and methods illustrate TCP Session Correlation (TSC) schemes that are configured to group multiple TCP sessions and associate the TCP sessions with a download of a single video file. The TSC schemes generally analyze video requests associated with TCP sessions to determine if these TCP sessions are correlated. This correlation can indicate that these TCP sessions are downloading the same video file.

The TCP session correlation information can provide contextual information for video applications such as video pacing and video popularity tracking. For example, in the video pacing application, if a network device determines that two TCP sessions are correlated, the network device can apply the video metadata, received over the first TCP session, to the second TCP session as well as the first TCP session. Also, in the video popularity tracking application, if a network device determines that two TCP sessions are correlated, the network device can indicate that the first TCP session and the second TCP session are associated with a single selection (or a single download) of the first video file. Based on this indication, the network device can add a single count, corresponding to the two TCP sessions, to a counter that is configured to maintain the number of distinct selections (i.e., downloads) of the video file. This way, the network device does not run afoul of double-counting a single selection of the video file.

The TSC schemes can correlate TCP sessions by first deriving an identification of the video file requested by individual video requests. Then the TSC schemes compare the derived identifications to determine whether TCP sessions associated with the video requests are correlated. For example, if the identifications are identical, then the TCP sessions associated the corresponding video requests are correlated; if the identifications are not identical, then the TCP sessions associated the corresponding video requests are not correlated.

In one embodiment, the identification can be the video location identifier of the requested video file. The video location identifier can include the video server's IP address or a uniform resource identifier (URI). For example, an HTTP partial get request is configured to indicate the video location identifier of the video file using a URI. If two HTTP partial get requests trigger a download of two video files at the same URI, then the two HTTP partial get requests are associated with correlated TCP sessions.

In another embodiment, the identification can be the size of the requested video file. For example, an HTTP partial get request is configured to indicate the size of the requested video file. Since two video files are highly unlikely to have the same file size, if two video requests are requesting video files with the same file size, it is highly likely that the two video requests are requesting the same video file. Therefore, in this case, the TCP sessions associated with these two video requests are likely to be correlated.

In yet another embodiment, the identification can be the video signature associated with requested video file. A video signature is a sequence of bits that identifies the requested video file. For example, a video signature can be a 1-second snippet of the requested video file. If two video requests ask for video files with identical video signatures, it's highly likely that the two video requests are requesting the same video file. Therefore, in this case, the TCP sessions associated with the two video requests are highly likely to be correlated.

FIG. 1 illustrates a communications network that implements a TCP session correlation mechanism in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology, can use a transceiver shown generally at 112 to connect a user equipment 134 to the network using a broadband or other access network.

The access network 106 can communicate with an access gateway 116 that can implement one or more functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WiFi/Femto/other transceiver 112. On the packet core side, the anchor gateway can communicate with the operator's IP service domain 124, the internet 126, IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a user equipment. Even when the user equipment 134 is detached from the network, the HSS 130 maintains the binding information until the user equipment 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communications network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
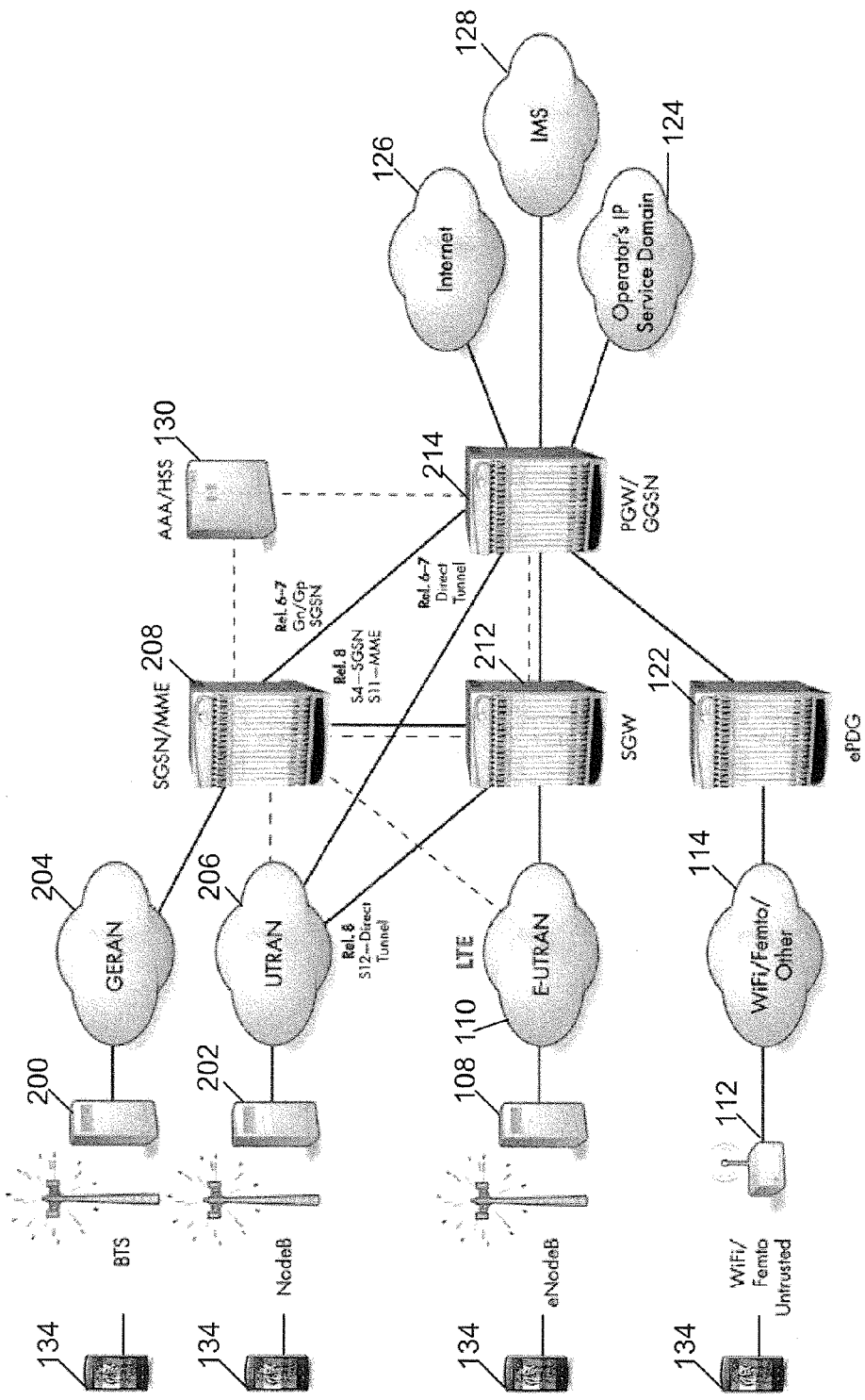

FIG. 2 illustrates a communications network that implements a TCP session correlation mechanism in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the TCP session correlation mechanism can be implemented on gateways, such as PGW/HA 118, PDSN/HSGW/SGW 116, SGSN/MME 208, PGW/GGSN 214, or SGW 212. The gateways can access and maintain information relating to the communication session, the subscriber, the radio bearers, and the policies relating to the communication session. The gateways may be used to provide various services to a user equipment 134 and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateways can be one or more network processing units, line cards, as well as packet and voice processing cards.

When a user equipment 134 plans to initiate a video transfer from a video content provider, the user equipment 134 can send a plurality of application layer protocol video requests to the video content provider over a communications network, where each video request requests a portion of the same video content. Under many application layer protocols, including HTTP, each video request would instantiate an independent application protocol session, such as a TCP session. Therefore, a network device, in the communication path between the user equipment 134 and the video content provider, can be oblivious of the fact that these TCP sessions collectively receive a single video file. Such a network device can include a gateway, a radio access point, or a base station.

To gather contextual information that multiple TCP sessions are downloading different parts of the same video file, a network device can perform TCP Session Correlation (TSC). TSC can be important in many video applications that require contextual information, such as the video pacing application. Although the following discussion focuses on implementing the TSC scheme on a gateway, the TSC scheme can be implemented in any network devices in the communication path between the user equipment 134 and the video content provider.

When a user equipment 134 sends multiple video requests to the video content provider, the video requests first reach the gateway. Subsequently, the gateway can (1) forward the video requests to the video content provider, and (2) analyze the video requests to determine whether the TCP sessions associated with the video requests are correlated. To determine the correlation between the TCP session, the gateway can implement a scheme such as one of the following: a file location based TSC scheme, a file size based TSC scheme, and a video signature based TSC scheme. In certain embodiments, these mechanisms can be configured to only analyze video requests originating from the same user equipment 134. Also, in other embodiments, these mechanisms can be configured to only analyze video requests received within a fixed period of time from one another. For example, once the first video request arrives at the gateway, the gateway can analyze the first video request against video requests received within 5 seconds of the first request's arrival. Such a pre-screening of video requests can reduce the computational overhead and increase the accuracy.

Figure 3:
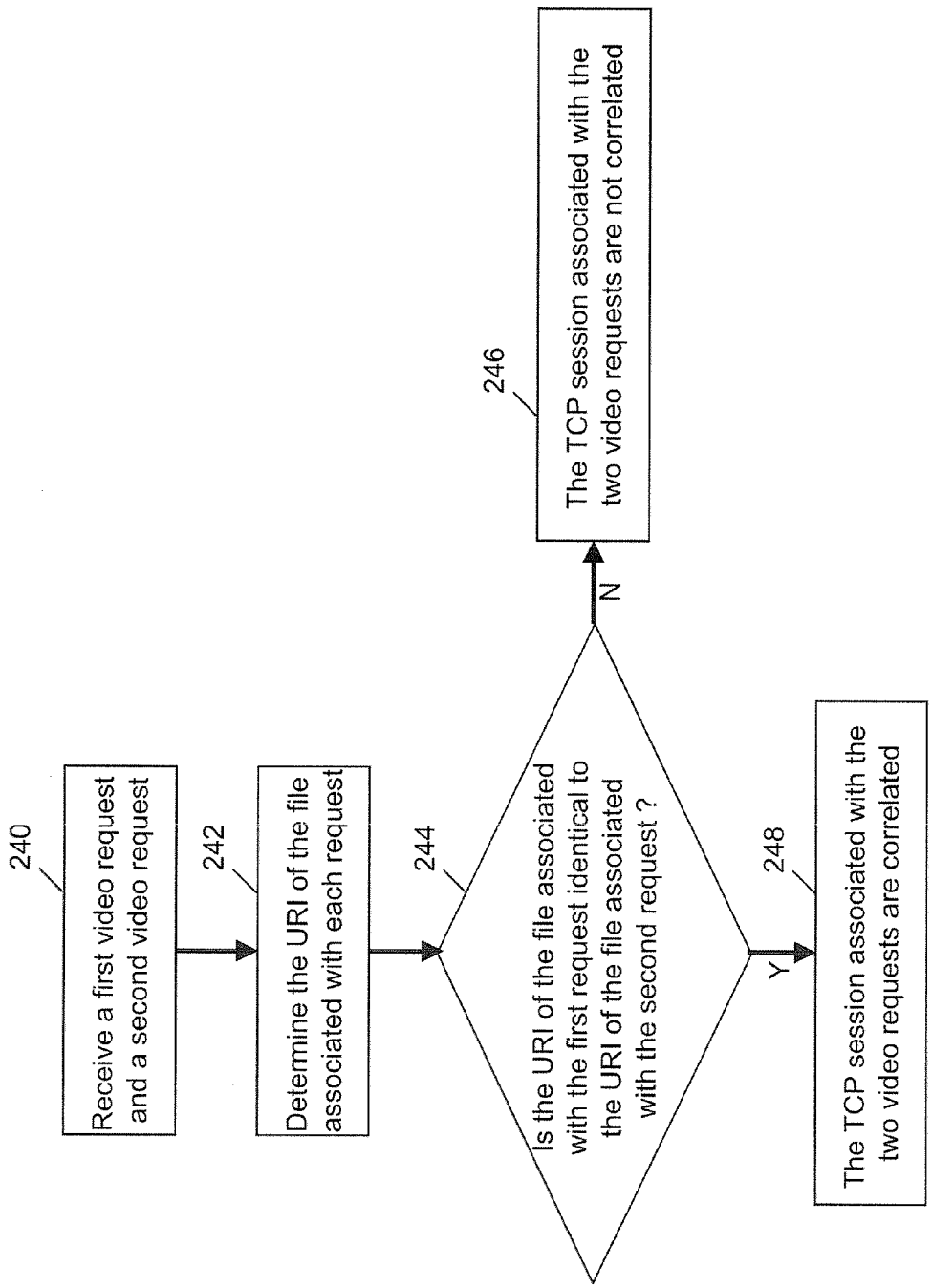
FIGS. 3-5 show flow diagrams for a transmission control protocol (TCP) session correlation mechanism in accordance with some embodiments.

FIG. 3 shows a flow diagram of the file location based TSC scheme in accordance with certain embodiments. If two video requests are downloading the same video content, it's highly likely that the video requests would request the video file at the same video location identifier. Therefore, by comparing the video location identifier of the requested video content, the gateway can determine whether the TCP sessions associated with the video requests are correlated. In step 240, the gateway receives a plurality of video requests, including a first video request and a second video request. The video requests can include an HTTP partial get request or an FTP get request. Each video request is received over different TCP sessions, where portions of the TCP sessions are established over a wireless network. In step 242, the gateway determines the video location identifier of the video file requested by the first video request and the second video request. If the video request is an HTTP partial get request, the gateway can determine the video location identifier of the associated video file by reading the Request-URI field in the header.

In step 244, the gateway determines whether the video location identifier of the video file associated with the first video request is identical to the video location identifier of the video file associated with the second video request. If the video request is an HTTP partial get request, the gateway can perform a string match operation on the Request-URI of the first video request and the Request-URI of the second video request. If the video location identifiers of the video files associated with the two video requests are different, then in step 246, the gateway determines that the TCP sessions associated with the two video requests are not correlated; if the video location identifiers of the video files associated with the two video requests are identical, then in step 248, the gateway determines that the TCP sessions associated with the two video requests are correlated.

The file location based TSC scheme is especially suited to a scenario in which the requested video content is only present at a single video location identifier. For example, if a video of the 2011 US Open Final match is only available from http://usopen.org/final.mpg, then two user equipment requesting the video have to specify the video using the same video location identifier usopen.org/final.mpg. This TSC scheme is also well suited to a scenario in which the video content is provided by a single file, as opposed to multiple volumes. In some cases, the same video has different video location identifiers. For example, the UE 134 can add tags at the end of the video location identifiers to refer to different temporal locations of the same video. In this case, the file location based TSC scheme can be used in conjunction with one or more of the methods described further below.

Figure 4:
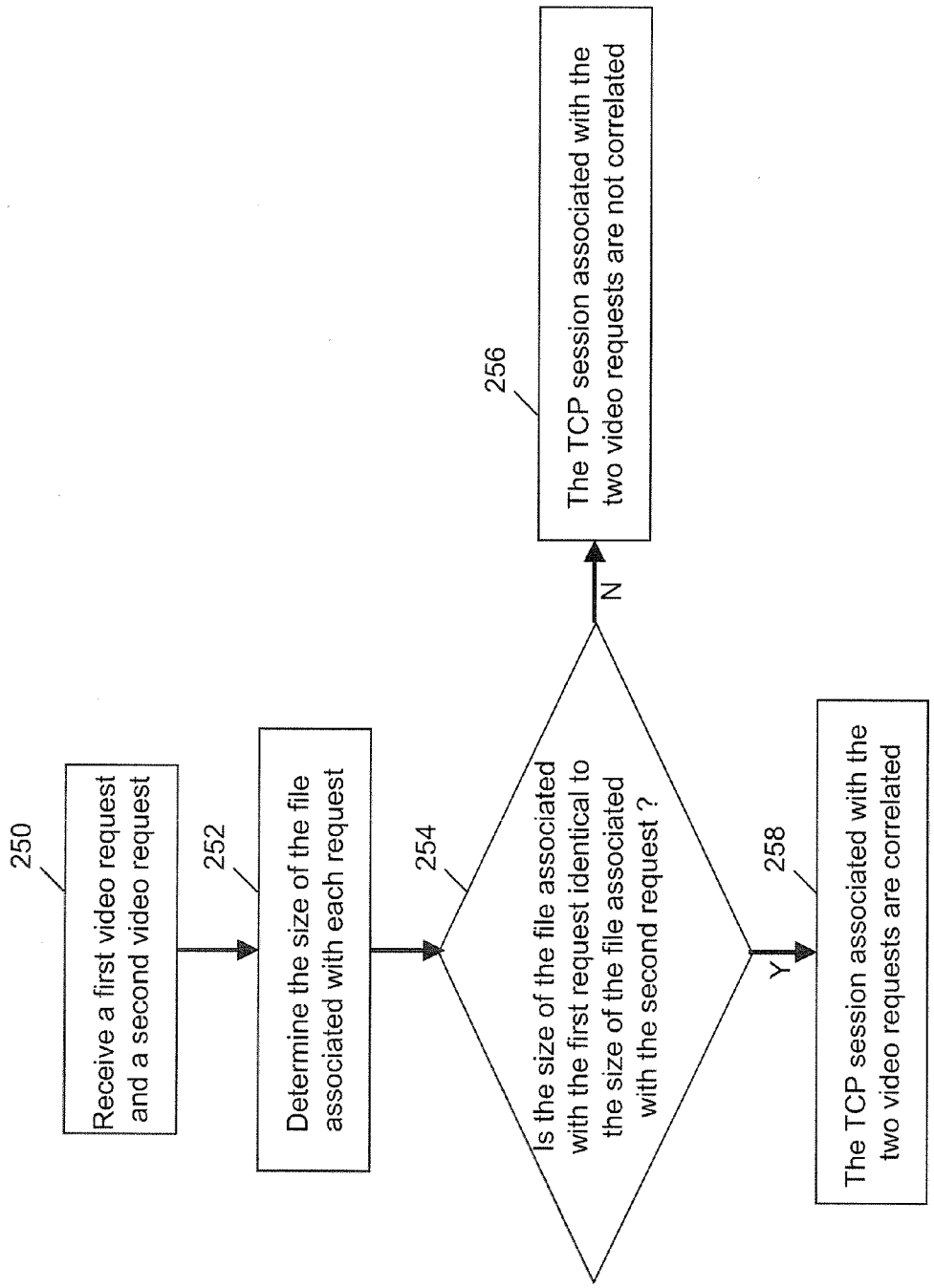

FIG. 4 shows a flow diagram of the file size based TSC scheme in accordance with another embodiment, in which TCP sessions are correlated by comparing the size of the video files associated with the TCP sessions. A user equipment 134 can concurrently download a plurality of video files from video content providers, but it is highly unlikely that two different video files downloaded concurrently by the same user equipment 134 have the same file size. Therefore, the gateway can correlate TCP sessions associated with the video requests by comparing the size of the requested video files. In step 250, the gateway receives a plurality of video requests, including a first video request and a second video request. Each video request is received over different TCP sessions, where portions of the TCP sessions are established over a wireless network. In step 252, the gateway determines the size of the video file requested by the first video request and the second video request. If the video request is an HTTP partial get request, the gateway can determine the size of the requested video file by analyzing the Content-Range field of the request's header.

In step 254, the gateway determines whether the size of the video file associated with the first video request is identical to the size of the video file associated with the second video request. If the size of the video files associated with the two video requests are different, then in step 256, the gateway determines that the TCP sessions associated with the two video requests are not correlated; if the size of the video files associated with the two video requests are identical, then in step 258, the gateway determines that the TCP sessions associated with the two video requests are correlated.

Figure 5:
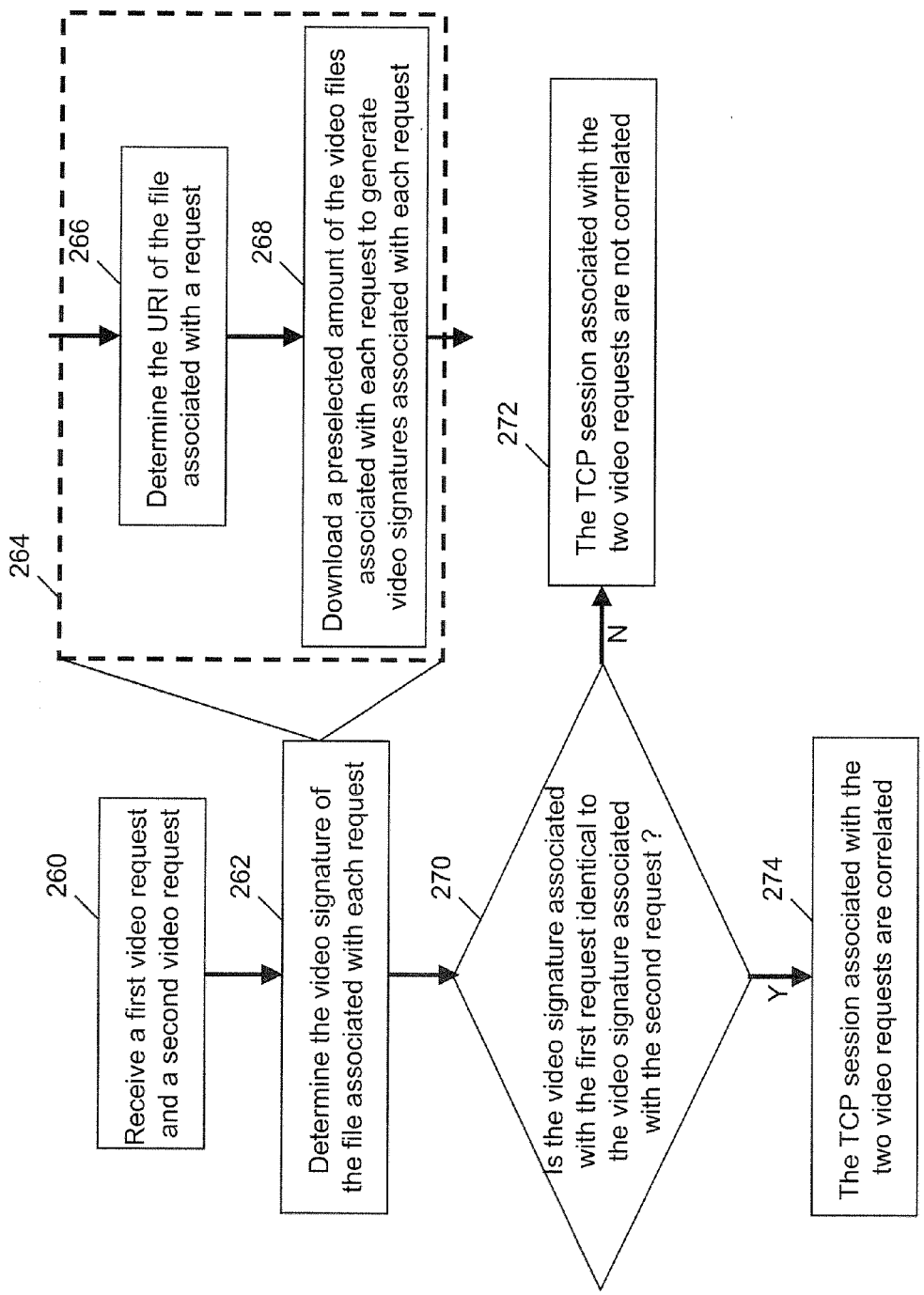

FIG. 5 shows a flow diagram of the video signature based TSC scheme in accordance with another embodiment. The location based TSC scheme and the file size based TSC scheme make implicit assumptions on the video content providers and/or video contents. Therefore, the accuracy of those mechanisms depends on how well the implicit assumptions are satisfied. The video signature based TSC scheme is useful when those implicit assumptions do not hold. This mechanism retrieves video signatures of video files requested by the video requests and compares the retrieved video signatures to determine whether the TCP sessions associated with the video requests are correlated. A video signature can be a representation that identifies the associated video file. For instance, in certain embodiments, a video signature can be a piece of the associated video file at a particular temporal location. Furthermore, in other embodiments, a video signature can be pieces of the associated video file at a plurality of temporal locations.

In step 260, the gateway receives a plurality of video requests, including a first video request and a second video request. Each video request is received over different TCP sessions, where portions of the TCP sessions are established over a wireless network. In step 262, the gateway determines the video signature of the video file requested by the first video request and the second video request. An exemplary embodiment for computing a video signature is shown in the box 264. In step 266 the gateway determines the video location identifier of the video files associated with each video request. If the video request is an HTTP partial get request, the gateway can determine the video location identifier of the video file by reading the Request-URI field of the request's header. In step 268, the gateway downloads a preselected amount of the video file requested by the first video request to generate a first video signature, and the gateway subsequently downloads a preselected amount of the video file requested by the second video request to generate a second video signature.

Once the video signatures associated with the first video request and the second video request have been determined, in step 264, the gateway determines whether the first video signature is identical to the second video signature. In one embodiment, the gateway can determine whether the first video signature is identical to the second video signature by comparing the video signatures in a bit-wise manner, which can be implemented efficiently using an exclusive-OR operator. If the two video signatures are different, then in step 266, the gateway determines that the TCP sessions associated with the two video requests are not correlated; if the two video signatures are identical, then in step 268, the gateway determines that the TCP sessions associated with the two video requests are correlated.

The accuracy of the video signature based TSC scheme can depend on (1) the size of the video signature and (2) the portion of the video file from which the video signatures are generated. In certain embodiments, the size of the video signature (i.e., the preselected amount of the video file) can be in the order of 100 bytes, which can be packed into a single packet. Also, in certain embodiments, the video signatures are generated roughly from the middle portion of the video file. In another embodiment, the video signatures can be generated by downloading short, multiple snippets of the video file from different temporal locations. The uniqueness of the video signature can increase as the size of the video signature increases and as the video signatures are generated from more temporal locations. Therefore, the gateway can balance the accuracy and the overhead of the TSC scheme by changing the size of the video signature and by changing the temporal location from which the video signature is generated.

Figure 6:
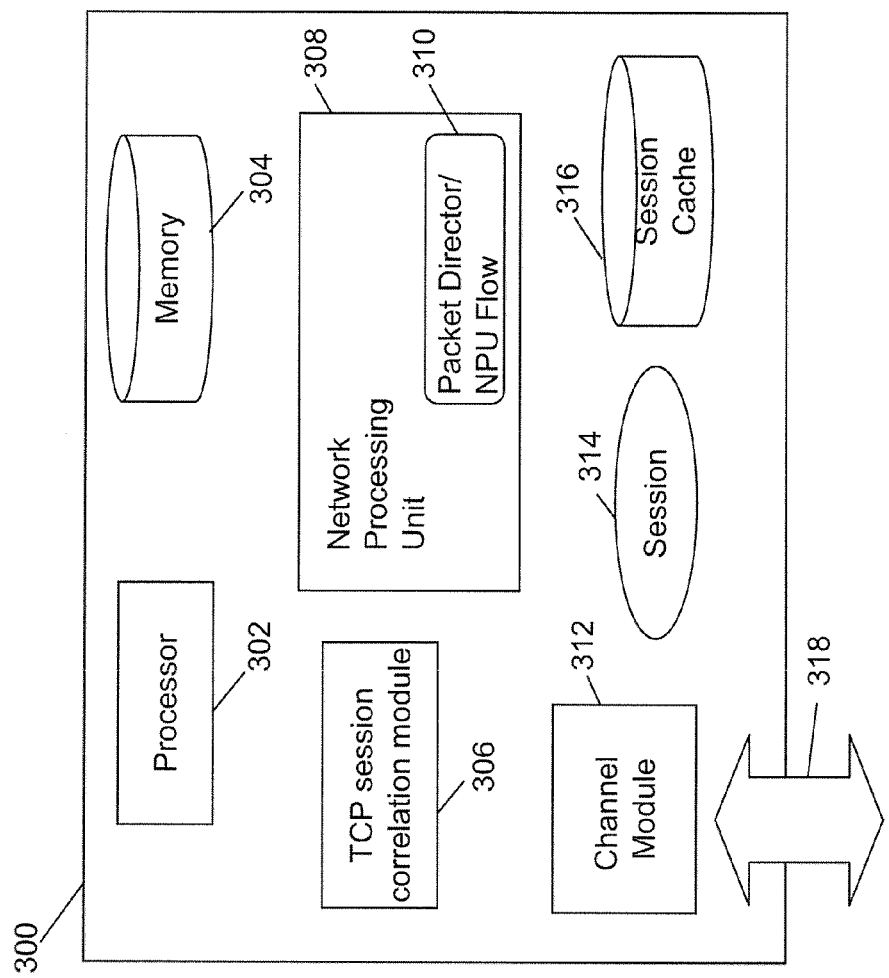
FIG. 6 illustrates a logical view of gateway in accordance with certain embodiments.

FIG. 6 illustrates a logical view of a gateway 300 in accordance with certain embodiments. The gateway 300 can include one or more of a processor 302, a memory 304, a TCP session correlation module 306, a network processing unit (NPU) 308, a packet director/NPU flow 310, a channel module 312, a session 314, a session cache/database 316, and an interface 318.

A TCP session correlation module 306 is configured to determine whether two or more TCP sessions associated with application layer protocol video requests are correlated, i.e., the TCP sessions download different parts of the same video file. To do so, the TCP session correlation module 306 is configured to (1) receive in-coming video requests including a first video request and a second video request, (2) derive a first identification of the video file requested by the first video request and a second identification of the video file requested by the second video request, and (3) compare the first identification and the second identification to determine if the video file requested by the first video request is identical to the video file requested by the second video request. If the two video requests are for the same video file, then the TCP sessions associated with the two video requests are correlated. The identification of the video file can be (1) the video location identifier of the video file, identified using a URI, (2) the size of the video file, or (3) a video signature that identifies the video file, such as a snippet of the video file. The video request can include an HTTP partial get request and an FTP get request.

If the video request is an HTTP partial get request, then the video location identifier of the video file can be read from the "Request-URI" field of the header and the size of the video file can be read from the "the Content-Range" field of the header. The TCP session correlation module 306 can be configured to only analyze video requests from the same user equipment 134 or to only analyze video requests that were received within a certain time period from one another. The TCP session correlation module 306 can be implemented in software using the memory 304 such as a tangible, non-transitory computer readable medium, a programmable read only memory (PROM), or flash memory. The software can run on a processor 302 that executes instructions or computer code. The TCP session correlation module 306 may also be implemented in hardware using an application specific integrated circuit (ASIC), programmable logic array (PLA), or any other integrated circuit.

An interface 318 can provide an input and/or output mechanism to communicate with other network devices. The interface 318 can provide communication with other gateways, application servers, and user equipment 134, as well as other core network nodes to send and receive control data. The interface 318 can be implemented in hardware to send and receive signals in a variety of mediums, such as optical, copper, and wireless, and in a number of different protocols some of which may be non-transient.

User Equipment and Gateway

The user equipment 134 described above can communicate with a plurality of radio access networks using a plurality of access technologies and with wired communication networks. The user equipment 134 can be a smart phone offering advanced capabilities such as word processing, web browsing, gaming, e-book capabilities, an operating system, and a full keyboard. The user equipment 134 may run an operating system such as Symbian OS, iPhone OS, RIM's Blackberry, Windows Mobile, Linux, Palm WebOS, and Android. The screen may be a touch screen that can be used to input data to the user equipment 134 and the screen can be used instead of the full keyboard. The user equipment 134 may have the capability to run applications or communicate with applications that are provided by servers in the communications network. The user equipment 134 can receive updates and other information from these applications on the network.

The user equipment 134 also encompasses many other devices such as televisions (TVs), video projectors, set-top boxes or set-top units, digital video recorders (DVR), computers, netbooks, laptops, and any other audio/visual equipment that can communicate with a network. The user equipment 134 can also keep global positioning coordinates, profile information, or other location information in its stack or memory. The user equipment 134 can have a memory such as a tangible, non-transitory computer readable medium, flash memory, a magnetic disk drive, an optical drive, a programmable read-only memory (PROM), and/or a read-only memory (ROM). The user equipment 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment 134 can also provide a variety of user interfaces such as a keyboard, a touch screen, a trackball, a touch pad, and/or a mouse. The user equipment 134 may also include speakers and a display device in some embodiments.

The TCP Session Correlation (TSC) schemes described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The TSC scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 7:
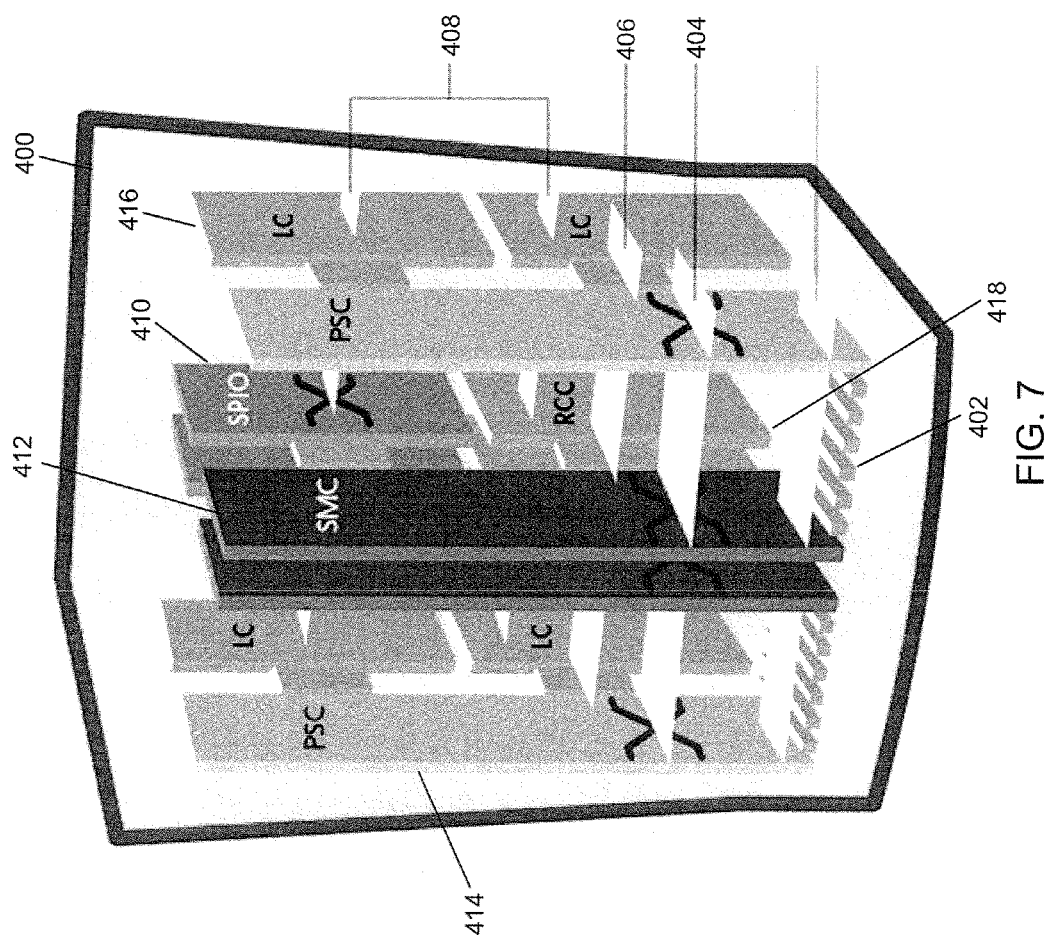
FIG. 7 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 7 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 8:
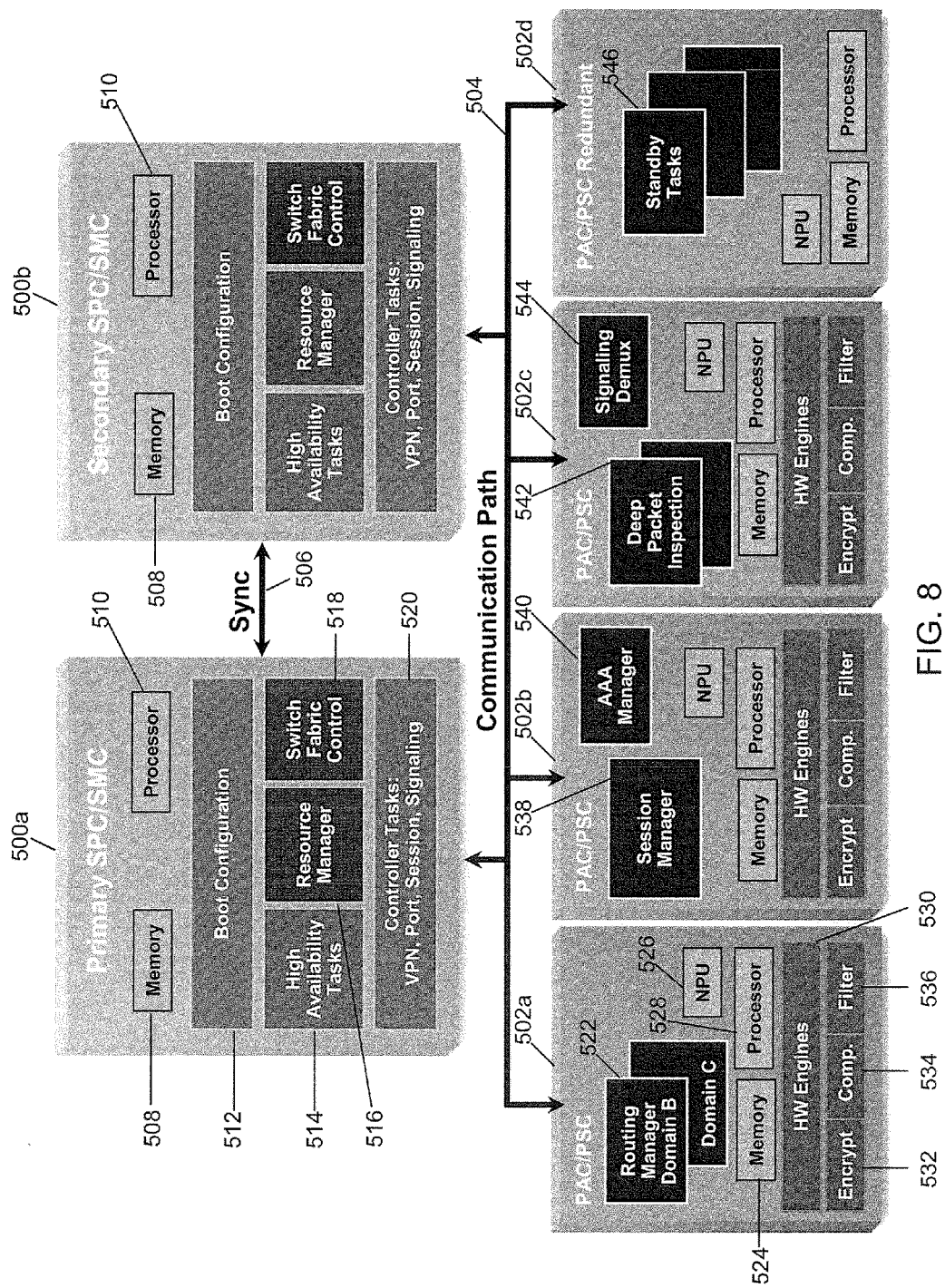
FIG. 8 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view of the software architecture of a network device in accordance with certain embodiments. As shown, the software and hardware can be distributed within the network device and across different circuit boards, processors, and memory. FIG. 8 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment 134.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment 134. A session allows a user equipment 134 to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a tangible, non-transitory storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the TSC scheme can be implemented at a base station in communication with a user equipment 134.

We claim:

1. A method comprising:

receiving, at a gateway in communication with at least one mobile device over a communication network having a wireless network, a first video request over a first transmission control protocol (TCP) session and a second video request over a second TCP session, wherein portions of the first TCP session and the second TCP session are established over the wireless network;

deriving a first identification of a first video file requested by the first video request, wherein deriving the first identification of the first video file includes deriving a first video signature based, at least in part, on a media content of the first video file;

deriving a second identification of a second video file requested by the second video request, wherein deriving the second identification of the second video file includes deriving a second video signature based, at least in part, on a media content of the second video file; and comparing, at the gateway, the first identification and the second identification to determine that the first TCP session and the second TCP session are correlated.

2. The method of claim 1, further comprising:

receiving metadata of the first video file over the first TCP session; and associating the metadata of the first video file with the second TCP session.

3. The method of claim 1, further comprising:

indicating that the first TCP session and the second TCP session are associated with a single selection of the first video file; and adding one count, for the first TCP session and the second TCP session, to a counter that is configured to maintain a number of distinct selections of the first video file.

4. The method of claim 1, wherein receiving the first video request over the first TCP session and the second video request over the second TCP session includes receiving a first HTTP partial get request over the first TCP session and a second HTTP partial get request over the second TCP session.

5. The method of claim 4, wherein deriving the first identification of the first video file includes deriving a first video location identifier of the first video file specified in the first video request, and deriving the second identification of the second video file includes deriving the second video location identifier of the second video file specified in the second video request.

6. The method of claim 5, wherein deriving the first video location identifier of the first video file includes reading a "Request-URI" field of the first video request, and wherein deriving the second video location identifier of the second video file includes reading a "Request-URI" field of the second video request.

7. The method of claim 1, wherein deriving the first identification of the first video file includes deriving a first size of the first video file specified in the first video request, and deriving the second identification of the second video file includes deriving a second size of the second video file specified in the second video request.

8. The method of claim 1, wherein deriving the first video signature includes downloading a predetermined portion of the first video file, and deriving the second identification of the second video file includes deriving a second video signature by downloading the predetermined portion of the second video file.

9. The method of claim 8, wherein downloading the predetermined portion of the first video file includes downloading pieces of the first video file at a plurality of temporal locations.

10. A gateway comprising:
an interface configured to provide communication with a mobile device over a first transmission control protocol (TCP) session and a second TCP session, wherein a first video request and a second video request from the user equipment is received over the first TCP session and the second TCP session, respectively, and wherein portions of the first TCP session and the second TCP session are established over a wireless network; and
a module that is configured to:
derive a first identification of a first video file requested by the first video request based, at least in part, on a media content of the first video file,
derive a second identification of a second video file requested by the second video request based, at least in part, on a media content of the second video file, and
compare the first identification and the second identification in order to determine that the first TCP session and the second TCP session are correlated.

11. The gateway of claim 10, wherein the first video request and the second video request include HTTP partial get requests.

12. The gateway of claim 11, wherein the first identification of the first video file is a first video location identifier of the first video file specified in a "Request-URI" field of the first video request, and the second identification of the second video file is a second video location identifier of the second video file specified in a "Request-URI" field of the second video request.

13. The gateway of claim 10, wherein the module is further configured to receive metadata of the first video file over the first TCP session, and to associate the metadata of the first video file with the second TCP session.

14. The gateway of claim 11, wherein the first identification of the first video file is a size of the first video file specified in the first video request, and the second identification of the second video file is a size of the second video file specified in the second video request.

15. The gateway of claim 11, wherein the module is configured to derive the first identification of the first video file by downloading a predetermined portion of the first video file, and further wherein the module is configured to derive the second identification of the second video file by downloading a predetermined portion of the second video file.

16. The gateway of claim 11, wherein the network device is a gateway.

17. One or more non-transitory media comprising logic that when executed is to cause a gateway to:
receive a first video request over a first transmission control protocol (TCP) session and a second video request over a second TCP session, wherein portions of the first TCP session and the second TCP session are established over a wireless network;
derive a first identification of a first video file requested by the first video request based, at least in part, on a media content of the first video file;
derive a second identification of a second video file requested by the second video request based, at least in part, on a media content of the second video file; and
compare the first identification and the second identification to determine that the first TCP session and the second TCP session are correlated.

18. The media of claim 17, wherein the first identification of the first video file is a size of the first video file specified in the first video request, and the second identification of the second video file is a size of the second video file specified in the second video request.

19. The media of claim 17, wherein the logic is operable to derive the first identification of the first video file by downloading a predetermined portion of the first video file, and further wherein the logic is operable to derive the second identification of the second video file by downloading a predetermined portion of the second video file.

20. The method of claim 1, wherein the first TCP session and the second TCP session are maintained concurrently at the gateway.

21. The method of claim 1 wherein comparing, at the gateway, the first identification and the second identification to determine that the first TCP session and the second TCP session are correlated comprises comparing the first video signature and the second video signature in a bit-wise manner to determine that the first video signature and the second video signature are identical.

22. The method of claim 1, further comprising performing video pacing in response to determining that the first TCP session and the second TCP session are correlated.

23. The method of claim 1, wherein:
the first video request requests both audio and video data of the first video file; and
the second video request requests both audio and video data of the second video file.

24. The method of claim 1, wherein the first video file and the second video file are the same video file.

* * * * *